United States Patent [19]

Bissell et al.

[11] Patent Number: 5,243,645
[45] Date of Patent: Sep. 7, 1993

[54] AUTOMATIC SYSTEM FOR FORWARDING OF CALLS

[75] Inventors: Elliston P. Bissell, Mendham; Frank J. Campano, Bridgewater, both of N.J.

[73] Assignee: AT&T Bell Laboratories, Murray Hill, N.J.

[21] Appl. No.: 607,925

[22] Filed: Nov. 1, 1990

[51] Int. Cl.$^5$ .............................................. H04M 3/54
[52] U.S. Cl. ..................................... 379/211; 379/91; 379/60
[58] Field of Search .................... 379/60, 210, 211, 61, 379/91, 144, 357, 212

[56] References Cited

U.S. PATENT DOCUMENTS

| | | | |
|---|---|---|---|
| 4,313,035 | 1/1982 | Jordan et al. | 379/61 |
| 4,601,064 | 7/1986 | Shipley | 379/211 |
| 4,658,416 | 4/1987 | Tanaka | 379/211 |
| 4,680,785 | 7/1985 | Akiyama et al. | 379/57 |
| 4,752,951 | 6/1988 | Konnecker | 379/211 |
| 4,852,156 | 7/1989 | Shigenaga | 379/172 |

Primary Examiner—James L. Dwyer
Assistant Examiner—Ahmad F. Matar
Attorney, Agent, or Firm—Barry H. Freedman

[57] ABSTRACT

Messages (such as telephone calls or data messages) are automatically forwarded to an individual who is away from his/her home or office based upon information obtained when the individual engages in a transaction or activity, such as making a credit card purchase or credit card call, that indicates his or her location, e.g., at a particular merchant or telephone. Information from the transaction that links the individual and his/her current location is forwarded to a database to update an electronic record indicating the individual's availability, and where the subscriber may be reached. A call thereafter placed to the individual, either using a personal telephone number or the ordinary home or office number, causes the individual's record to be accessed and current location retrieved, so that the message can be automatically forwarded to that location. In some instances, the caller is furnished with the caller's general location (i.e., area), so that the message can be transmitted via cellular telephone, paging or other wireless communication.

24 Claims, 6 Drawing Sheets

DATABASE RECORD

| | |
|---|---|
| REFERENCE TRANSACTION CARD NUMBER | 400 |
| SUBSCRIBER PLN | 401 |
| HOME/OFFICE NUMBER | 402 |
| ALTERNATE NUMBER | 413 |
| COLLECT CALLER PIN NUMBER | 412 |
| CURRENT REACH NUMBER | 403 |
| CELLULAR/WIRELESS PHONE NUMBER | 410 |
| CURRENT CELLULAR/WIRELESS AREA NUMBER | 404 |
| PAGING NUMBER | 411 |
| CURRENT PAGING AREA NUMBER | 405 |
| VOICE MESSAGING SERVICE NUMBER | 406 |
| FLAGS: AUTO COLLECT, ALL CALLS AUTO COLLECT, AUTO COLLECT ALLOWED, UNAVAILABLE, PAGING, CELLULAR, WIRELESS, VOICE MESSAGING | 407 |
| CALLBACK QUEUE | 408 |
| CALLBACK NUMBER ○ ○ ○ ○ ○ | 409 |

FIG. 6

| | |
|---|---|
| MERCHANT NUMBER | 601 |
| ORIGINATING TELEPHONE NUMBER | 602 |
| REACH NUMBER | 603 |

FIG. 7

| ORGINATING TELEPHONE NUMBER RANGE | PAGING AREA | CELLULAR AREA | WIRELESS AREA |
|---|---|---|---|
| ○ | ○ | ○ | ○ |
| ○ | ○ | ○ | ○ |
| ○ | ○ | ○ | ○ |
| ○ | ○ | ○ | ○ |
| 908-949-2000 TO 949-9999 | 71 | 52 | 1076 |
| ○ | ○ | ○ | ○ |
| ○ | ○ | ○ | ○ |
| ○ | ○ | ○ | ○ |
| ○ | ○ | ○ | ○ |

701

AUTOMATIC SYSTEM FOR FORWARDING OF CALLS

FIELD OF THE INVENTION

This invention relates generally to telecommunications and in particular, to forwarding of telecommunications calls to individuals when they are away from their normal locations.

BACKGROUND OF THE INVENTION

U.S. Pat. No. 4,313,035 issued to D. S. Jordan et al. on Jan. 26, 1982, describes a Method of Providing Person Locator Service in which a person desiring to receive telephone calls when he or she is away from their normal home or business location can update information stored in a centralized database, so as to link an assigned personal locator number (PLN) with a telephone number at which the person is presently located. Thereafter, if any calls are placed to the person using their assigned PLN, the calls may be forwarded to the telephone at the person's present location.

While the Jordan invention is quite useful in dealing with establishing communications in our increasingly mobile society, it suffers nevertheless from some limitations. In particular, it is necessary for the subscriber to take affirmative action in order to update the system, by placing a call to a centralized database in order to change the information stored therein that is associated with their PLN. If the person forgets or otherwise fails to make the call, the system cannot work, as the stored information will be absent or out of date. Likewise, even if the call is made, but the plans of the person traveling are changed for any number of reasons, subsequent calls to the person may be misdirected.

U.S. Pat. No. 4,901,340 issued to T. S. Parker et al. on Feb. 13, 1990, attempts to deal with a similar problem in the context of cellular mobile radiotelephone service, in which each subscriber has a designated home service area, and is considered a "roamer" when in any other areas. In order to enable completion of calls to roamers, Parker proposes a system in which the subscriber places a request at a foreign mobile telephone switching office (MTSO), indicating that the roamer desires that calls placed to his or her home service area be forwarded to a different area, normally the area in which the roamer is currently located. This request, after validation, causes a temporary directory number to be assigned to the subscriber. Subsequent calls to the home MTSO are then forwarded to the roamer at the foreign MTSO.

Here again, the system will be useful only if the subscriber takes the active step of requesting assignment of a temporary directory number in the area served by a foreign MTSO. Without this step, the system is unaware of the movement of the subscriber, and calls cannot be forwarded.

SUMMARY OF THE INVENTION

In accordance with the present invention, a subscriber who is traveling away from his or her home or office can have calls forwarded to a different location that is determined automatically when the subscriber engages in a transaction or activity that indicates his or her location. Advantageously, this transaction/activity can be any action that causes an electronic database to be updated with information that directly or indirectly is indicative of the subscriber's whereabouts, either specific or general. Examples include the authorization/verification processing associated with the use of a credit card at a location such as a hotel or airport, the making of a long distance telephone call with a credit card that identifies the subscriber, or the use of an Automated Teller Machine (ATM).

When the transaction or activity occurs, information describing both the subscriber and his/her location is forwarded to a centralized database in order to update a subscriber database record that indicates the status of the subscriber's availability, and if or where the subscriber may be reached. In one embodiment of the invention, a call thereafter placed to the subscriber using a unique PLN similar to that proposed in the above cited Jordan patent causes the associated subscriber database record to be accessed, automatically forwarding the call to the correct location. In another embodiment, a call placed to the subscriber's ordinary home or office number (or wireless personal phone), if not answered, is then forwarded to a reach number determined by querying the database. In some instances, such as where the transaction or activity is transient, (e.g. the purchase of fuel at a service station or a credit card transaction at a bank or ATM) or where the subscriber desires to receive calls at a cellular phone or via a paging or other wireless communications device, information describing the general location (i.e. region, area code, paging service area, or mobile telephone cell) of the subscriber can be provided to the network, to automatically forward calls to the subscriber in the designated area. If desired, ancillary services can also be provided. For example, when the transaction occurs, the database can be examined to determine if the subscriber should be alerted to the presence of messages in his or her electronic mailbox.

Because the present invention requires no extra effort on the part of the subscriber to keep his/her present location current in the database, and is activated by a transaction (such as credit card usage or the placing of a long distance call) that would otherwise occur normally, it is more likely to be effective and useful. It is not necessary for the subscriber to remember specifically to update his or her database record. In addition, there is less likelihood of errors due to changes in travel plans, since the information stored in the database is derived from actual usage information rather than information entered ahead of time based upon intended travel plans.

BRIEF DESCRIPTION OF THE DRAWINGS

The present invention will be more fully appreciated by consideration of the following detailed description, when read in light of the accompanying drawing in which.

DETAILED DESCRIPTION

Figure 1:
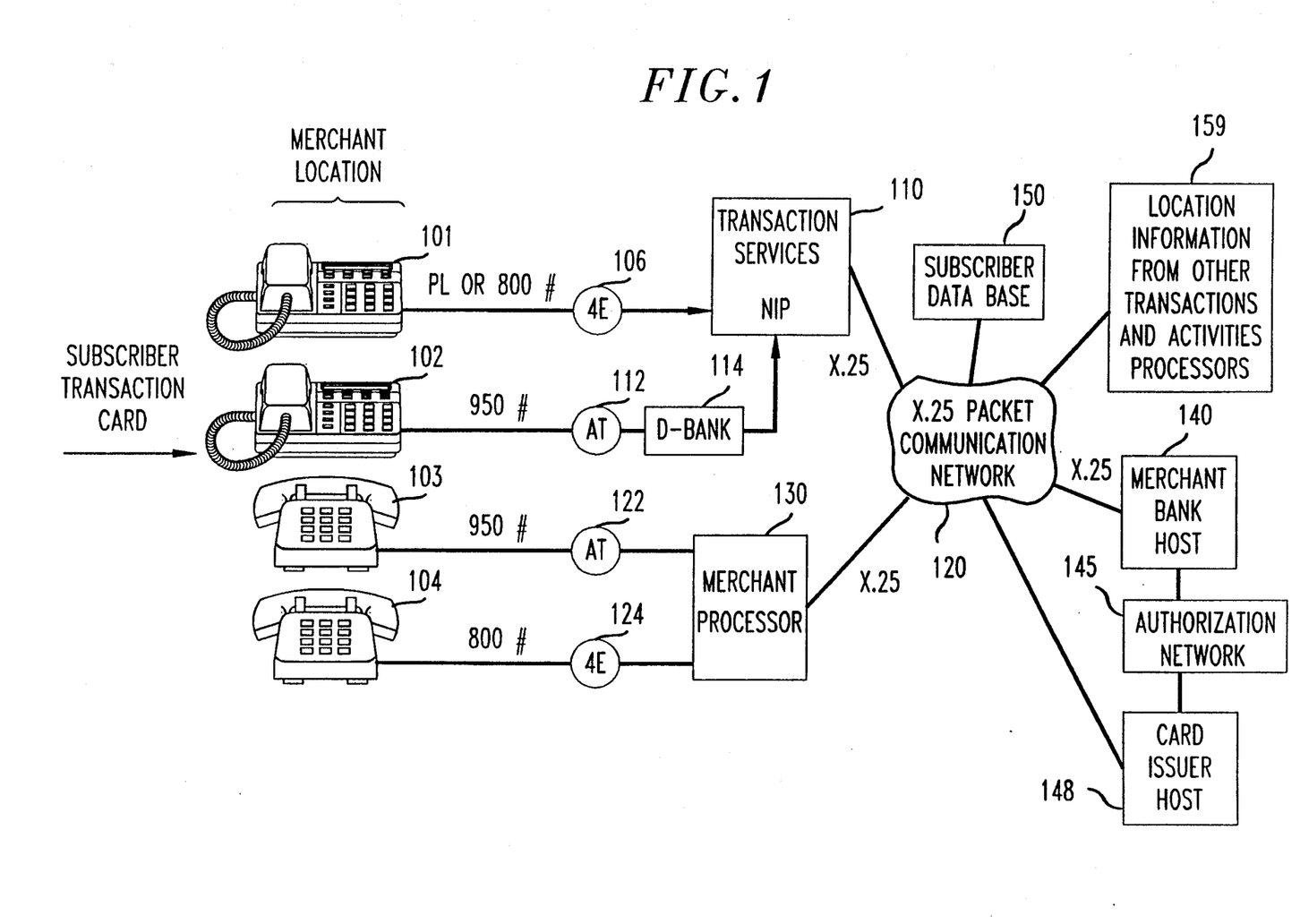
FIG. 1 is a block diagram illustrating the interrelationship between point of transaction devices and a database that contains subscriber location information that is updated automatically in accordance with the present invention.

Referring first to FIG. 1, there is shown a block diagram illustrating the interrelationship between several point of transaction devices and a subscriber's database record stored in a database 150 that contains subscriber location information that is updated automatically in accordance with the present invention. In one embodiment, the point of transaction devices are credit card terminals 101,102 and telephones 103,104, and the transaction that enables automatic call forwarding is a credit card purchase. However, as explained below, other transactions and point of transaction devices may also be used.

Credit card terminal 101 is illustratively connected through a X.25 packet communications network 120 such as the Accunet Packet Service (APS) Network provided by AT&T, to a merchant bank host computer 140 that is arranged to validate the credit card transaction internally or to interact with a remote card issuer host computer 148 to obtain validation. The communication and validation process between terminal 101 and host computers 140 and 148 is well documented, as described, for example, in U.S. Pat. No. 4,386,266 issued to D. J. Chesarek on May 31, 1983.

By way of illustration, the connection between credit card terminal 101 and host computer 140 may be established via a #4ESS electronic switching system 106 and a transaction services network interface processor (NIP) 110. Switching system 106 receives the call from terminal 101 via a private line or via the 800 direct dialed network, or other switched connection (Data Over Voice, Very Small Aperture Terminal, Cellular Digital Radio, etc.) and directs the call to NIP 110, where it may be converted to the well-known X.25 digital format. The data is then routed through network 120 to host computer 140.

Credit card terminal 102, on the other hand, can also be the source of transaction information, and may extend a call to a D-channel bank multiplexer 114 via an access tandem 112. The output of multiplexer 114 is then supplied to data communications network 120. In this way, a merchant may dial a 950 number which gives the caller access to feature group B functionality while using a 7 digit number rather than a 10 digit 800 number, as is the case with terminal 101.

Also as shown in FIG. 1, point of transaction information can illustratively originate in telephone 103, which is interconnected with merchant processor 130 via access tandem 122, or in telephone 104, which is interconnected with merchant processor 130 via #4ESS electronic switching system 124. Merchant processor 130 may be an automated system such as an AT&T Conversant 2 audio response unit available from AT&T Conversant Systems, which interacts with callers using prompts to obtain desired information, or may be a computer terminal operated by a live agent. Information collected by merchant processor 130 is supplied to host computer 140 via data communications network 120, again illustratively using the X.25 format.

As stated previously, host computers 140 and 148 are arranged, in conventional fashion, to receive information from terminals 101, 102 and telephones 103, 104 describing the proposed transaction, and to return validation information to the originating terminal or telephone, indicating, for example, an authorization code. Host computers 140 and 148 then typically update a database record associated with the individual that initiated the transaction. The new information can include the available credit limits as well as other information describing the transaction just authorized.

In the event that host computer 140 does not itself contain the data base records associated with the individual that initiated the transaction, further communications are established with remote card issuer host computer 148 via international authorization network 145. This results in updating of the information in host computer 148, and the transmission of authorization information to the originating telephone or terminal.

In accordance with the present invention, the transaction initiated in terminals 101, 102 or telephones 103, 104, also causes host computer 140 or 148 to supply data to database 150 indicative of the identity of the individual that initiated the transaction and the location at which the transaction occurred. While individual elements of the data sent to database 150 may vary, depending upon the specific data processing arrangement used in host computers 140 and 148, transmitted data typically includes the account number of the credit card user, the identification number of the merchant location at which the transaction occurred, and the originating telephone number. The latter number can be obtained using Automatic Number Identification (ANI) forwarding supplied by the telephone network, as described, for example, in U.S. Pat. No. 4,555,594 issued to Friedes et al. on Nov. 26, 1985. This information is sufficient to enable, for each subsriber of the automatic forwarding system of the present invention, determination of the current location of the subscriber, either at a specific place or in a general area, and, if a specific place, the associated telephone number at that location. Data from host computers 140 and 148 may be illustratively formatted using the X.25 standard and communicated to database 150 using the conventional X.25 Accunet Packet Switched Network 120.

Figure 2:
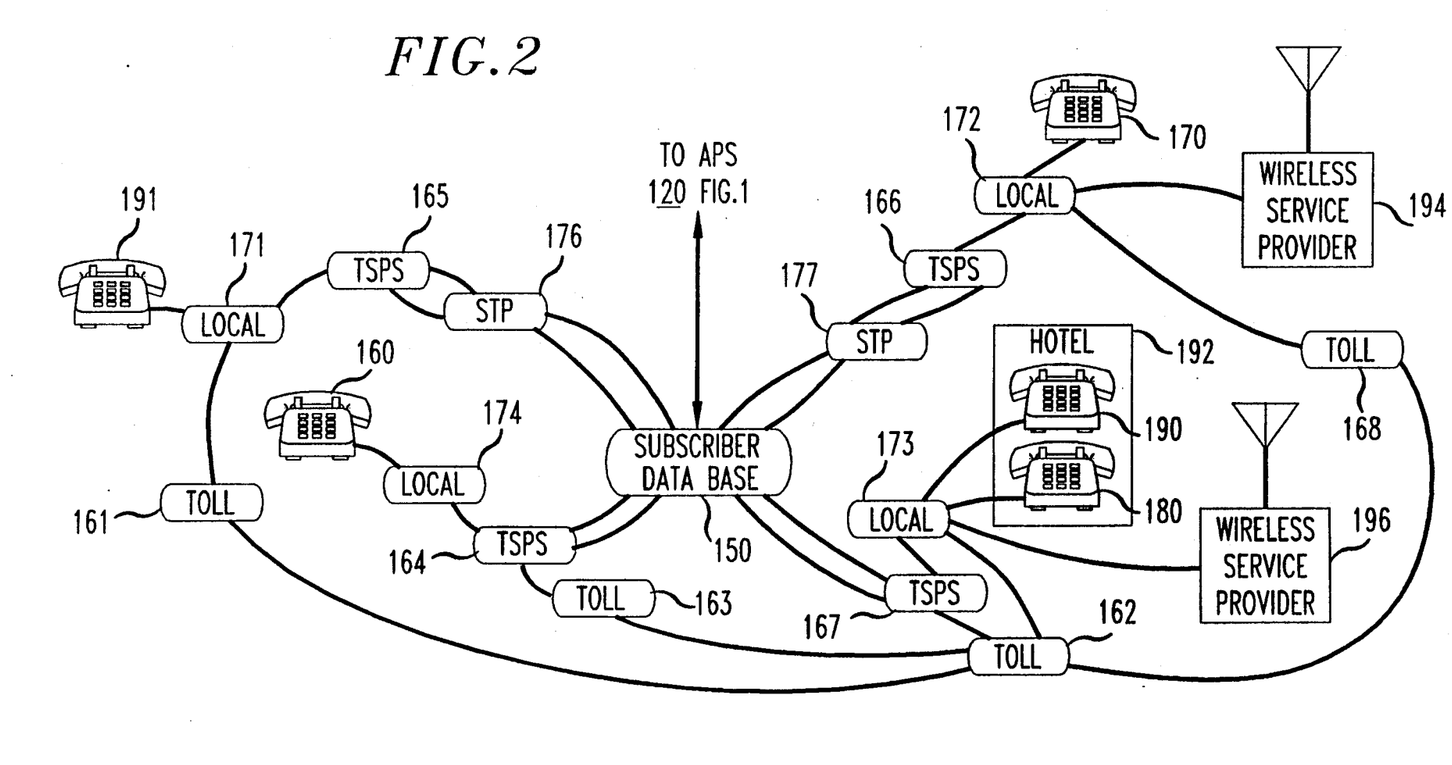
FIG. 2 is a block diagram illustrating one arrangement for rerouting of calls directed to a subscriber based upon automatically obtained location information.

The routing and/or forwarding of telecommunications calls (i.e. voice or data calls, facsimile transmissions, cellular calls, etc.) in accordance with the present invention is illustrated generally in FIG. 2. This illustration, which is but a tiny portion of the telecommunications network, is intentionally made similar to that shown in FIG. 1 of the aforecited Jordan patent, for the reason that many of the components can be arranged in the same or analogous ways. For certain types of calls, it is to be understood that somewhat different (but nevertheless well known) network interconnections may be used to set up basic connections. Generally, information in database 150 is used in several ways in accordance with the present invention. First, like the Person Locator Service described in the Jordan patent, the stored information can be used to forward calls made by dialing the subscriber's unique personal locator number (PLN), to the subscriber's current location. Second, the subscriber database record can be accessed if calls to the subscriber's regular telephone number are not answered, so as to automatically forward these calls to a different number. Additionally, the information can be used to announce to a caller that the subscriber can be reached via a different number, either using a cellular telephone call, paging, or other over-the-air communication directed to a particular area in which the subscriber is located. These uses are described more fully below.

As shown in FIG. 2, a caller originating a call at telephone 160 to a subscriber having a home/office telephone 170, would normally complete the call using portions of the public switched international telephone network, such as local office 174, traffic service position system (TSPS) 164, a series of interconnected toll switches 163, 162, 168, and finally local office 172. Of course, the precise network interconnection can be accomplished in myriad ways well known to those skilled in the art, and for this reason, additional interconnected TSPSs 165, 166, 167 and toll switch 161 are also shown in FIG. 2. Similar call routing is fully explained in conjunction with FIG. 1 of the Jordan patent.

In accordance with the present invention, when the subscriber has engaged in a credit card transaction at a hotel 192 served by telephone 190, host computer 140 or 148 of FIG. 1 transmits information to database 150 that allows the subscriber's database record to be updated with information describing the subscriber's current location. As a result, calls thereafter initiated to the subscriber are now forwarded to the current location (e.g., telephone 190) instead of the previous location (e.g., telephone 170). The forwarding mechanism can occur in several ways: First, if the caller at telephone 160 dials the subscriber's PLN (for example, a "700" number) rather than his/her home/office telephone 170, a query is directed from TSPS 164 to database 150 in exactly the same manner as a PLN call is routed in the Jordan system. Database 150, which may comprise an AT&T #4ESS switch (described in *Bell System Technical Journal*, Vol. 56, No. 7, September 1977) equipped with disk storage and a system of programs to establish, edit, interpret and arrange information stored in memory, is arranged to retrieve the current reach number (e.g., the number associated with telephone 190) for the subscriber. Database 150, which also includes facilities for interface communication with various STPs and toll switches in the network of FIG. 2, then communicates the reach number to TSPS 164, so that the call can then be properly forwarded, e.g., to telephone 190.

Forwarding can also occur in various other ways. For example, if the caller dials the subscriber's home-/office number or personal wireless telephone number in the ordinary manner, and no response (answer) is received in TSPS 164. After a specified time interval, a query is forwarded from TSPS 164 to database 150, in order to retrieve the current reach number for the subscriber at telephone 190.

If the subscriber has a cellular telephone or a pager, a normal call to the subscriber from telephone 160 might proceed via local office 174, TSPS 164, toll switches 163, 162 and 168, and local office 172 to a wireless service provider 194, which transmits an over-the-air signal to the subscriber in its geographic territory. If no response is received, TSPS 164 may query database 150 to determine that the subscriber is now in a different area. The call is then routed, for example, via toll switches 163 and 162 to local office 173, and thence to wireless service provider 196 that serves the second area. Alternatively, database 150 may return a message to the caller indicating the area code or other geographic indicator needed to page the subscriber in the vicinity of hotel 192. In yet other circumstances, database 150 may be arranged to forward an unanswered call made to a wireless service provider (e.g., provider 194) to a terrestrial based telephone (e.g., telephone 190).

Before further describing the process performed in database 150, it is to be observed here that the subscriber database record may be updated by a variety of transactions or activities performed by the subscriber in addition to the initiation of a credit card authorization process. For example, as shown in FIG. 2, the subscriber may initiate a 0+ (i.e., operator assisted) telephone call at telephone 180, which may be located in hotel 192. In this event, the call is first routed through local office 173 to TSPS 167, which checks credit card validity and allows the call access into the network. Since, as described in the Jordan patent, a TSPS comprises a processor, memory, software program, switching network, and other equipment for automatically handling certain types of calls, and it also interfaces callers with operator positions for semiautomatic handling of calls which require operator assistance. It can be arranged, in accordance with our invention, to initiate a process which updates the information stored in database 150. A banking transaction using an ATM or any other transaction processor 159 of FIG. 1 can be the source of location information used to update records in database 150. The types of transactions that may provide information to database 150, and typical characteristics of available data, are shown in the following table:

| | DATA AVAILABLE | |
|---|---|---|
| TYPE OF TRANSACTION | Subscriber Identification | Location Information |
| Credit Card Purchase | Account No. | Store No., Originating telephone No. [ANI] |
| Credit Card or 0+ Telephone Call | Credit Card No. Billing No. | Originating Telephone No. |
| ATM Transaction | Account No. | Bank Location or Machine Identification No. |

Figure 3:
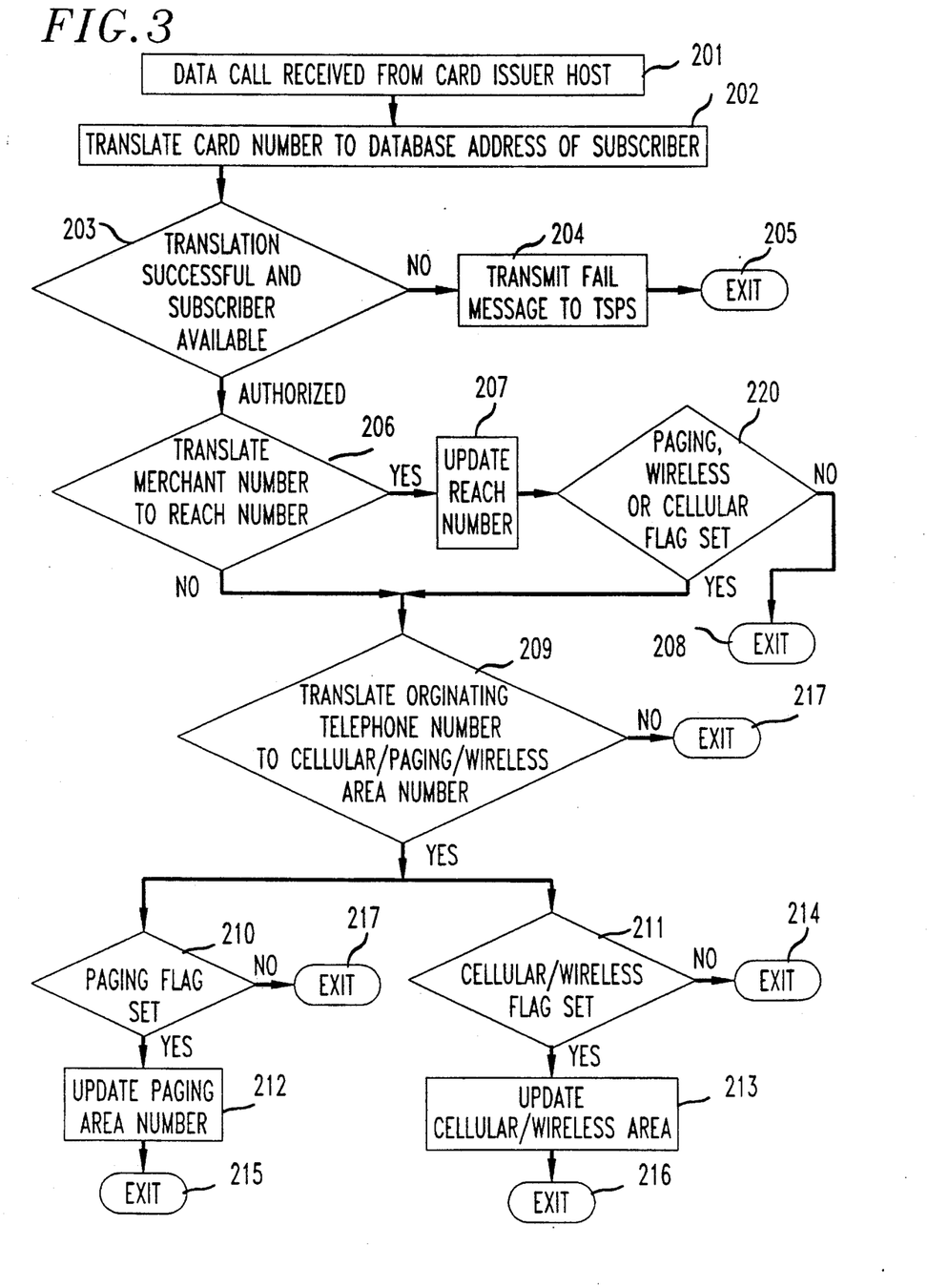
FIG. 3 is a logic flow diagram illustrating the sequence of steps used to update a database record that contains information relating to a subscriber of the automatic message forwarding system contemplated by the present invention.

Referring now to FIG. 3, there is shown a logic flow diagram illustrating a typical sequence of steps used to update a subscriber database record in database 150 of FIG. 1 when a subscriber of the automatic message forwarding system contemplated by the present invention initiates a transaction such as making a credit card purchase. This process is carried out in database 150 in response to information received from host computers 140 or 148 or from transaction processor 159 of FIG. 1. For the purposes of explanation, it is assumed hereafter that the information was derived from host computer 140.

Concurrent with or subsequent to conventional credit card processing in host computer 140 or 148, data is received (201) in database 150 indicating the location and card number of a person involved in a credit transaction. Database 150 attempts to translate (202) the received credit card number to a database address associated with a subscriber of the automatic forwarding system, typically using a standard table look-up. If the translation is successful (203), the person involved in the transaction is considered to be a subscriber of the automatic forwarding system provided by the present invention and the database record that contains information relating to that subscriber is retrieved for updating. Optionally, a subscriber to automatic call forwarding can choose to temporarily inhibit record updates or call forwarding. In such case, his/her database record is appropriately flagged by inserting data into database 150 either manually, using an attendant, or through an interactive data input session initiated by the subscriber as described in the Jordan patent. If it is determined in step 203 that the person has not subscribed to the service (or has set the unavailable flag indicating he/she does not desire to update his/her record or forward calls) a "fail message" is transmitted (204) to the TSPS within the network of FIG. 2 that is connected to host computer 140 and the database update process is terminated (205). In order to update the retrieved database record, the merchant identification data associated with the terminal 101,102 or telephone 103,104 at which the credit card transaction originated is translated (206) to a "reach number" to which calls to the subscriber are to be forwarded. For example, hotel 192 may use several telephones or credit card terminals to validate credit transactions at the front desk, in the restaurant, and in hotel shops. Each of these sources of a credit card authorization may generate the same or different merchant identification data, and yet be associated with a single reach telephone number used to call guests that are staying in the hotel. This translation can be accomplished by database 150 using a simple table look-up process as described in more detail below.

Figure 6:
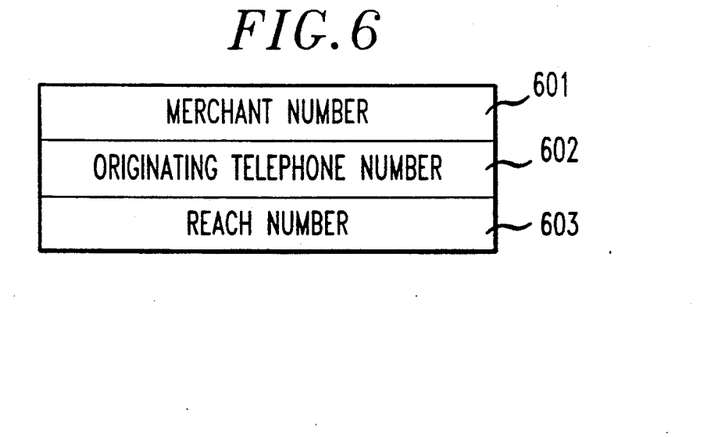
FIG. 6 is a diagram illustrating the contents of a database record maintained for each merchant location for which a reach number is available.

The translation in step 206 can be better understood by reference to FIG. 6 which illustrates the contents of a typical record maintained in database 150 for each merchant location for which a reach number is available. The record includes a merchant number in field 601, an originating telephone number in field 602 and an associated reach number in field 603. In the context of a credit card transaction, the merchant number in field 601 is typically an identification number assigned to each merchant by the merchant bank. For example, all locations of Acme International Hotels may have the same merchant number that is used in conjunction with the credit card transactions involving MasterCard, Visa and American Express. In the context of a ATM transaction, the merchant number would uniquely identify the ATM at which the transaction originated. The merchant identification field would not be used in the context of a credit card telephone call.

Because as explained above, some merchants may use the same merchant number for many locations, a separate record, each having a different originating telephone number is field 602 is used to uniquely identify each location. For example, the Acme International Hotel located in New York will have a record with the same merchant number (field 601) with a different originating telephone number (field 602) from the Acme Hotel located in Toronto.

The reach number included in field 603 of each record represents the number at that location that may be used to reach persons at that location. Thus, the reach number for Acme's hotel in Toronto would typically be the main switchboard number for that hotel.

In the event that during the translation step 206 of FIG. 3, both the merchant number and originating telephone number do not match any merchant record stored in database 150, a reach number for the subscriber is considered to be unavailable. In these cases, the originating telephone number alone is used in step 209 to update the subscriber's record with a corresponding cellular/paging/wireless area number. Also, in the event of a 0+ telephone call, an ATM transaction, or other transaction from processor 159 of FIG. 1, which identifies the subscriber and his/her location via the originating telephone number, but which does not have a merchant number that matches any record stored in database 150, only the cellular/paging/wireless area information in the subscriber's record is updated.

Figure 7:
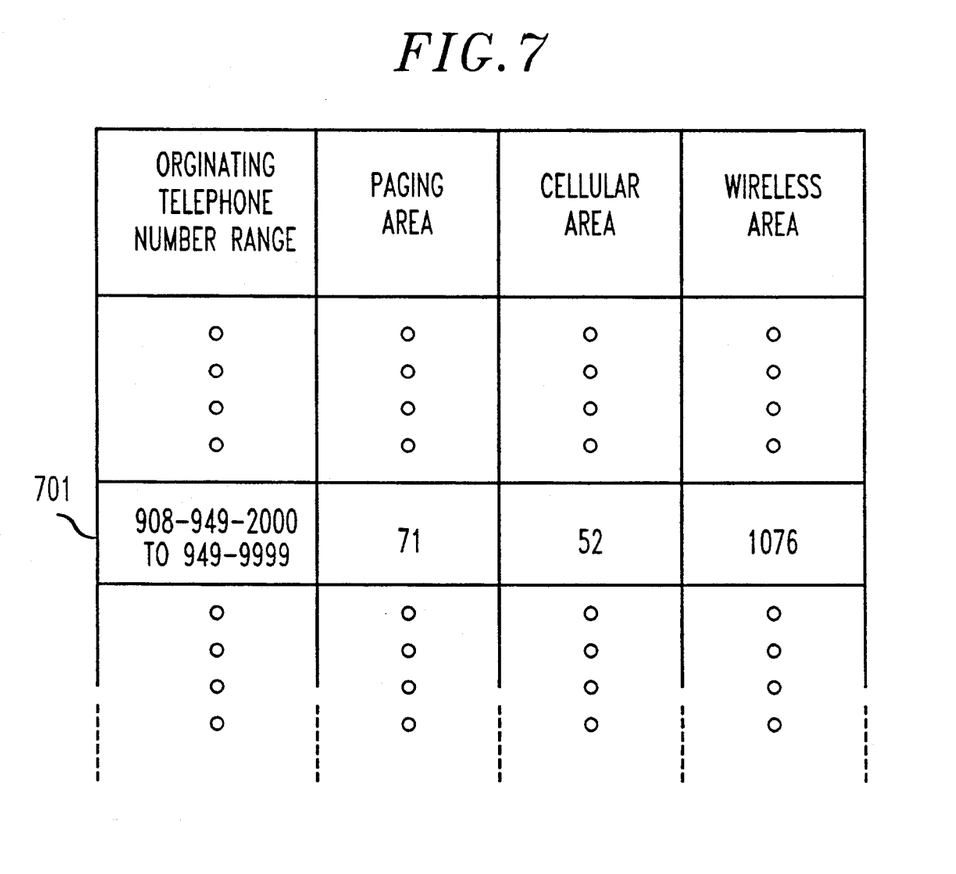
FIG. 7 is a diagram illustrating the contents of a lookup table that associates a paging area, cellular area and wireless area with ranges of originating telephone numbers.

The translation effected in step 209 is further illustrated in conjunction with FIG. 7, which depicts a look-up table that may be stored in database 150 that associates a paging area, cellular area and wireless area with different ranges of originating telephone numbers. For example, as shown in line 701 in FIG. 7, originating telephone numbers in area code 908 in the range between 949-2000 and 949-9999 may be associated with paging area 71, cellular area 52, and wireless area 1076.

The translation just described can also update the subscriber's database record with a "reach number" that may be applicable at a future time. For example, if the translation involves the purchase of an airline ticket, processor 159 may transmit information to database 150 indicating the location of the subscriber at some future time. This type of information may be parsed and processed in database 150 using techniques well known in the data processing art to yield a table of destinations and time intervals associated with each destination.

If the translation (206) is successfully completed, the subscriber's database record is updated (207) and if the paging or cellular/wireless flags (explained below) are not set (220), the process is then terminated (208). If it is determined (220) that either the cellular/wireless or paging flag is set, or if no translation can be performed (206) (i.e., if the requisite reach number information is determined to be unavailable), an attempt is made to translate (209) the merchant originating telephone number (ANI) information to a cellular/wireless or paging area number. For example, if a credit card verification transaction occurs at a gas station or a bank (rather than at a hotel), an attempt is made to translate the merchant ANI information to a cellular/wireless/paging area number that indicates the geographic region in which the subscriber is (or is likely to be) located. This information is used to update the subscriber database record to indicate that cellular phone calls, over-the-air pages or other wireless services directed to that subscriber should be made to the area or geographic region in which the gas station, bank (or other merchant) is located. If the translation cannot be effected, the process is terminated (217).

After completion of the translation (209), a determination is made (210 or 211), respectively, as to whether the subscriber is in fact a cellular mobile telephone, wireless, and/or paging customer. This is done by examining the "value" of flags included in the subscriber's record in database 150. If either of these queries yields a positive response, the paging area and/or cellular/wireless area information are added to the subscriber's record in database 150, in steps 212 and 213, respectively. Otherwise, the process is terminated (214, 215, 216 or 217), as appropriate.

Figure 4:
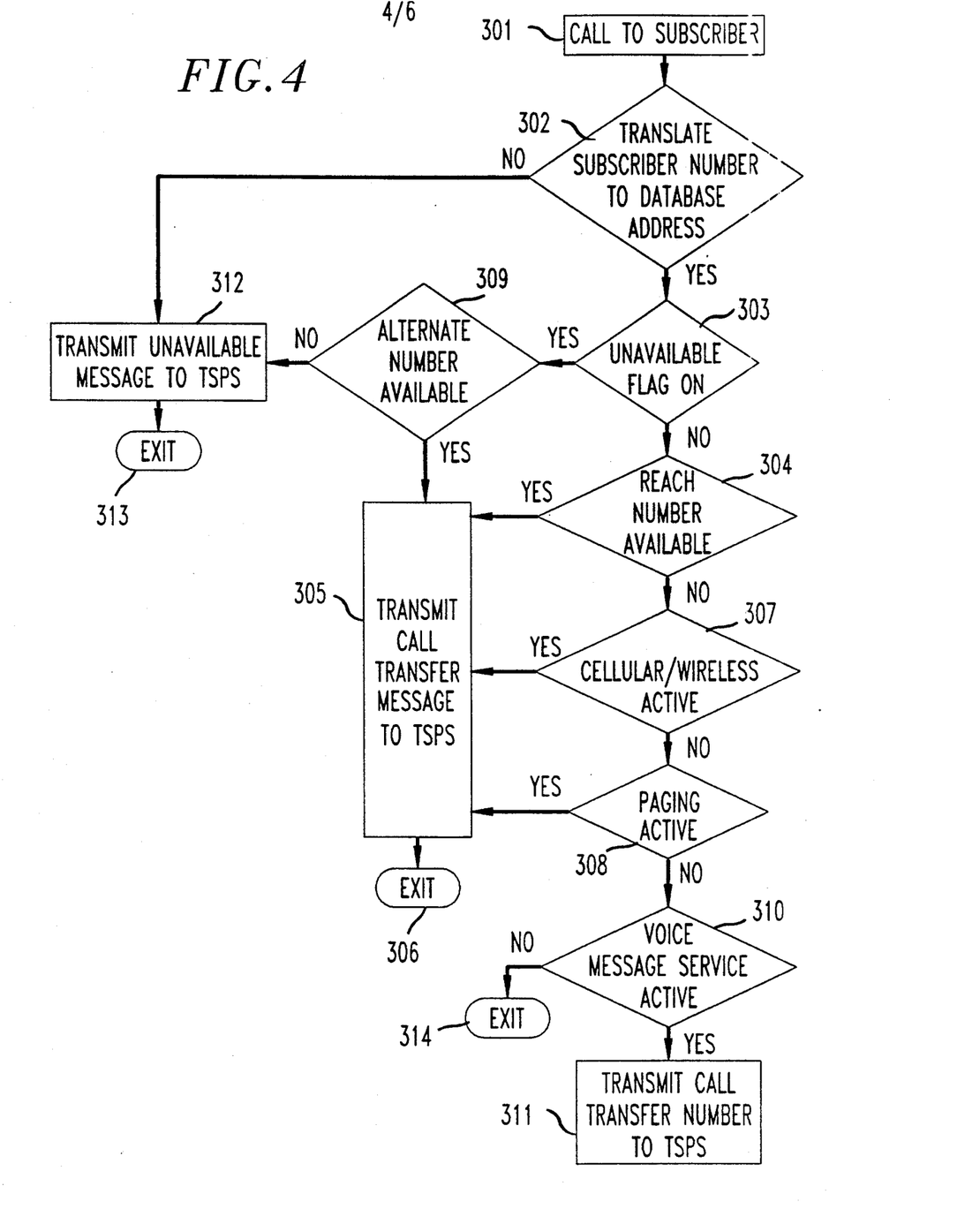
FIG. 4 is a logic flow diagram illustrating the sequence of steps followed when a call is placed to a subsriber of the automatic message forwarding system contemplated by the present invention.

Referring now to FIG. 4, there is shown a logic flow diagram illustrating the sequence of steps followed in database 150 upon receipt (301) of a query generated when a call is placed to a subscriber of the automatic message forwarding system contemplated by the present invention. In one possible scenario, the call is placed from telephone 160 in FIG. 2 to the subscriber using his/her PLN. This call is routed from telephone 160 to TSPS 164 of FIG. 2, which in turn directs a query to database 150, using the subscriber's PLN. Other scenarios, described above, could result from a query to database 150 generated by an unanswered call to the subscriber's home, office or wireless number. However, the subscriber may sometimes wish to inhibit or restrict dissemination of this information, in which case if it is determined in steps 303 and 304 both that the subscriber has not turned on the unavailable flag and that a forwarding (reach) number is present in the subscriber database record, information necessary to effect forwarding of the call is supplied (305) to TSPS 164, so that the call can be appropriately routed over the network of FIG. 2. This rerouting is accomplished in precisely the same manner as in the Jordan patent. The process in database 150 is then terminated (306). If a reach number is not available, but cellular/wireless or paging service is active for this subscriber, as determined in steps 307 or 308, respectively, appropriate information is also provided (305) by database 150 to TSPS 164 so that a cellular call, paging or other wireless communication can be initiated. Alternatively, instead of automatically forwarding the call, a message may be sent to TSPS 164 instructing the TSPS to provide a recording to the caller at telephone 160 indicating that the subscriber is not currently available, but that he/she is located in an area (as indicated in the retrieved subscriber database record) that can be accessed by mobile cellular phone, paging, or other wireless service.

In the event that the call forwarding is determined to be unavailable in step 303, database 150 can optionally be arranged to determine (309) if an alternate number is available for completion of the call. If so, the appropriate alternate number is transmitted (305) from database 150 to TSPS 164, routing the call to, for example, telephone 170 via toll switches 163, 162 and 168. An unavailability determination in step 309 is used to produce a "subscriber unavailable" message (312), which is supplied to the caller, usually using stored voice response equipment, whereupon the process is terminated (313).

If steps 304, 307 and 308 all produce negative responses but the subscriber has elected (310) to utilize a voice messaging service, a call transfer number is transmitted (311) such that the caller is connected via network 155 to conventional voice messaging apparatus that can store messages for later retrieval. If voice messaging is not selected, the process of FIG. 4 is terminated (314). A similar process can be used in connection with calls to a subscriber's home telephone. In this arrangement, a call placed to the subscriber, if not answered after a predetermined time interval, is redirected by the originating TSPS to database 150, whereupon the process of FIG. 4 is used, just as though database 150 had been accessed directly using the subscriber's PLN in the first instance.

Figure 5:
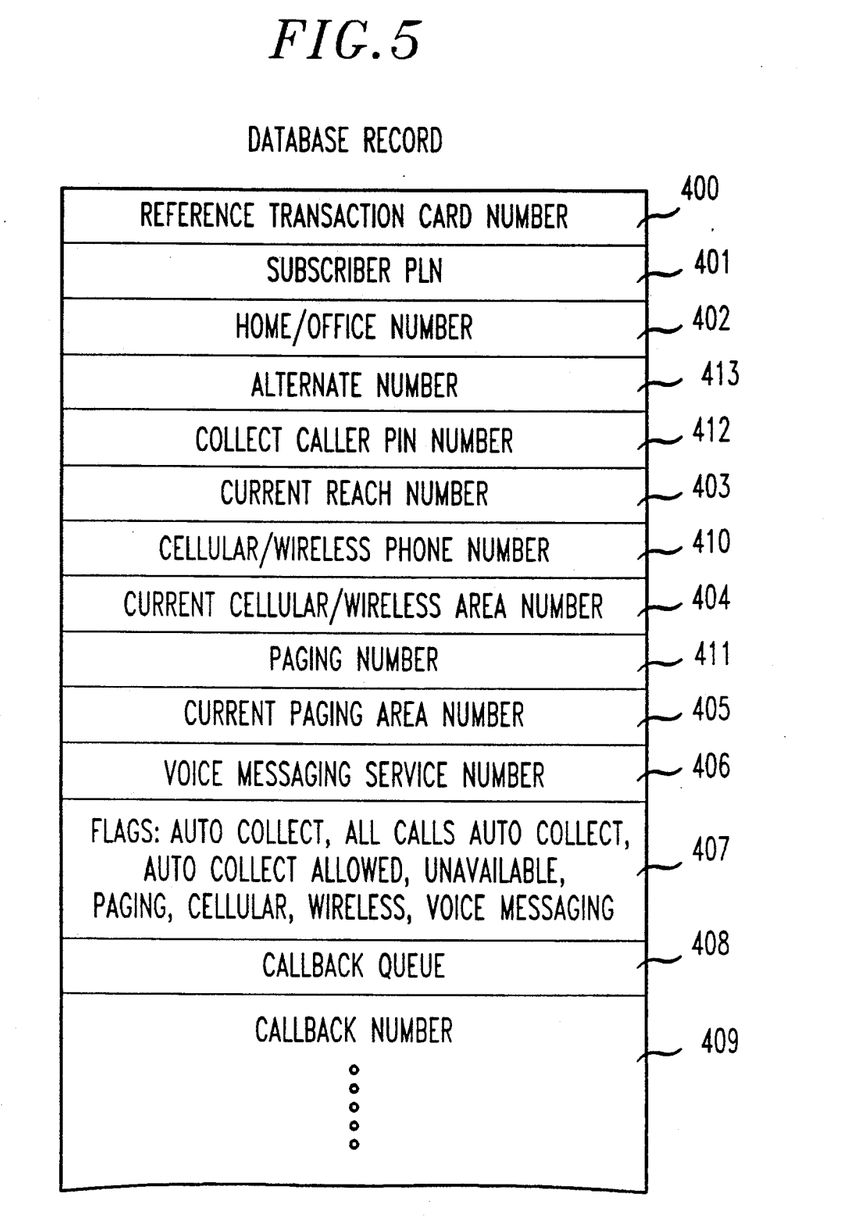
FIG. 5 is a diagram illustrating the contents of a database record maintained for each subscriber of the automatic message forwarding system contemplated by the present invention.

FIG. 5 is a diagram illustrating the typical contents of a database record maintained in database 150 for each subscriber of the automatic message forwarding system contemplated by the present invention. As stated previously, each record is accessed in database 150 by its association with the PLN or telephone number of the called subscriber.

As shown in FIG. 5, each record includes in field 400 the transaction card number or numbers which identify the subscriber. This could include one or more credit card numbers, a bank ATM card number, or any other number which uniquely identifies the subscriber when he/she makes a transaction that can update his/her record in accordance with our invention. In field 401 the record includes the subscriber PLN, and in field 402, the normal home or office telephone number for the subscriber. Field 413 contains the optional alternate number used in step 309, which number may be supplied by a subscriber. The subscriber's cellular/wireless phone number and paging number are stored in fields 410 and 411, respectively. This information is needed to effect a conventional call forwarding connection from the caller to the subscriber via a cellular/wireless call or a paging system, when a terrestrial call cannot be completed.

In field 403, information is stored representing the current reach number for the subscriber. This information is automatically updated by the present invention is step 207 of FIG. 3, when a transaction such as credit card validation occurs. Fields 404 and 405 are optional, and contain the current cellular and paging areas, respectively, that are associated with the current location of the subscriber. These fields are also updated automatically in accordance with the present invention, in steps 212 and 213 of FIG. 3.

Field 406 contains the call transfer number for the subscriber's voice messaging service.

Field 407 contains several flags that determine the services and preferences established for the subscriber. Illustratively, these include flags for auto collect, unavailable, paging, cellular, voice messaging, etc. A detailed description of this information is contained in the above-cited Jordan patent.

If desired, the record of FIG. 5 can also include fields 408 and 409 which contain callback information assembled for the subscriber from calls that were attempted but not completed. This situation occurs when a caller cannot be connected to the subscriber and is given the option to leave a return callback number.

Persons skilled in the art will appreciate that various modification and additions can be made to the present invention without departing from its spirit and scope. For example, host computers 140 and/or 148 may be arranged to compare all transaction information against a stored table listing subscribers to automatic forwarding contemplated by this invention, and to transmit to database 150 information only for credit card users determined to be subscribers. In this event, database 150 may dispense with steps 204 and 205 of FIG. 3. Accordingly, the invention should be limited only by the appended claims.

We claim:

1. Apparatus for automatically completing telecommunication calls to a subscriber as a direct result of a business transaction activity of said subscriber at a remote location, including means for deriving information regarding the location of said subscriber from information regarding said business transaction activity;

means for including said location information in a signaling message;

means for transmitting said signaling message to and storing said location information in a database; and means for directing calls to said subscriber based upon said location information stored in said data base.

2. The invention defined in claim 1 wherein said business transaction activity is a credit card transaction at a merchant location, and wherein said deriving means includes means for associating said merchant location with said subscriber location.

3. The invention defined in claim 1 wherein said business transaction activity is a credit card telephone call, and wherein said deriving means includes means for determining said subscriber location based upon the location of the telephone at which said call is made.

4. The invention defined in claim 1 wherein said directing means includes means for forwarding calls made to a personal telephone number assigned to said subscriber to a location identified in said database.

5. The invention defined in claim 1 wherein said directing means includes means for directing calls made to the ordinary home or office of said subscriber to said subscriber at a location identified in said database.

6. The invention defined in claim 1 wherein said information deriving means includes means for deriving a reach telephone number from a credit card transaction originated at a merchant location.

7. Apparatus for automatically completing calls to a subscriber at a location different from that subscriber's home/office location, including means for storing in a database a subscriber record including information for forwarding a call to said subscriber;

means for updating said subscriber record as a direct result of a business transaction activity of said subscriber other than a call from said subscriber to said database, said business transaction activity being indicative of the present location of said subscriber, and means for accessing said subscriber record in response to a call directed to said subscriber, to obtain information indicative of said present location of said subscriber, whereby said calls may be completed to said subscriber at said present location.

8. Apparatus for forwarding telecommunication calls to an individual traveling away from his/her normal location, including means for storing information indicative of the present location of said individual;

means for updating said stored information as a direct result of a business transaction activity made by said individual, said business transaction activity involving use of a telecommunications network originating at a certain location and excluding origination of a call to said storing means; and means for routing telecommunications calls to said individual at said certain location.

9. The invention defined in claim 8 wherein said business transaction activity includes a credit card transaction; or a credit card call; or a banking transaction at an ATM.

10. The invention defined in claim 8 wherein said apparatus further includes means for accessing said stored information using a personal locator number assigned to said individual; and means for routing calls made to said individual using said stored information.

11. The invention defined in claim 8 wherein said apparatus further includes means for accessing said stored information using an ordinary telecommunication number assigned to said individual; and means for routing calls made to said individual using said stored information.

12. The invention defined in claim 8 wherein said telecommunications calls include:

a voice call; or a data call; or a facsimile transmission; or a cellular telephone call; or notification via radiotelephone paging.

13. A method of automatically completing telecommunication calls to a subscriber as a direct result of a business transaction activity of said subscriber at a remote location, including the steps of deriving information regarding the location of said subscriber from information regarding said business transaction activity;

transmitting said location information to a database without initiation of an outgoing call by said subscriber to said database;

storing said location information in a record in said database that is associated with said subscriber; and completing calls to said subscriber based upon said location information stored in said database.

14. The method defined in claim 13 wherein said business transaction activity is a credit card transaction at a merchant location, and wherein said deriving step includes associating said merchant location with said subscriber location.

15. The method defined in claim 13 wherein said business transaction activity is a credit card telephone call, and wherein said deriving step includes determining said subscriber location based upon the location of the telephone at which said call is made.

16. The method defined in claim 13 wherein said completing step includes routing calls made to a personal telephone number assigned to said subscriber to a location identified in said storing step.

17. The method defined in claim 13 wherein said completing step includes routing calls made to the ordinary home or office of said subscriber to said subscriber at a location identified in said storing step.

18. The method defined in claim 13 wherein said information deriving step includes deriving a reach telephone number from a credit card transaction originated at a merchant location.

19. A method of automatically completing calls to a subscriber at a location different from that subscriber's home/office location, including the steps of storing in a database a subscriber record including information for forwarding a call to said subscriber;

updating said subscriber record as a direct result of a business transaction activity of said subscriber other than a call from said subscriber to said database, said business transaction activity being indicative of the present location of said subscriber, and accessing said subscriber record in response to a call directed to said subscriber, to obtain information indicative of said present location of said subscriber, whereby said calls may be completed to said subscriber at said present location.

20. A method of forwarding telecommunication calls to an individual traveling away from his/her normal location, including the steps of
    storing information indicative of the present location of said individual;
    updating said stored information as a direct result of a business transaction activity made by said individual, said business transaction activity involving use of a telecommunications network originating at a certain location and excluding origination of a call to said storing means; and
    routing telecommunications calls to said individual at said certain location.

21. The method defined in claim 20 wherein said business transaction activity includes
    a credit card transaction; or a credit card call; or a banking transaction at an ATM.

22. The method defined in claim 20 wherein said method further includes
    accessing said stored information using a personal locator number assigned to said individual; and
    routing calls made to said individual using said stored information.

23. The method defined in claim 20 wherein said method further includes
    accessing said stored information using an ordinary telecommunication number assigned to said individual; and
    routing calls made to said individual using said stored information.

24. The method defined in claim 20 wherein said telecommunications call includes:
    a voice call; or a data call; or a facsimile transmission; or a cellular telephone call; or notification via radiotelephone paging.

* * * * *